March 25, 1952     B. B. HOLMES ET AL     2,590,702
HIGH-PRESSURE VALVE
Filed Dec. 9, 1946
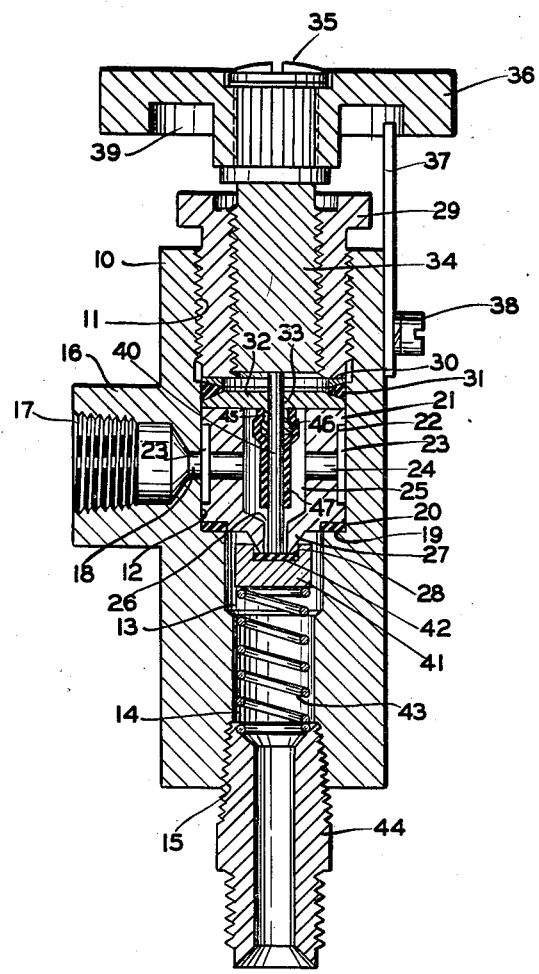
INVENTORS
BRADFORD B. HOLMES
JACOB L. PAULY
BY
ATTORNEY Patented Mar. 25, 1952

2,590,702

UNITED STATES PATENT OFFICE 2,590,702

HIGH-PRESSURE VALVE

Bradford B. Holmes, New York, N. Y., and Jacob L. Pauly, Hasbrouck Heights, N. J., assignors to Bendix Aviation Corporation, Teterboro, N. J., a corporation of Delaware Application December 9, 1946, Serial No. 715,068

2 Claims. (Cl. 251—137)

This invention relates to shut-off valves for controlling fluids, particularly gases, under high pressure.

In previous attempts to control fluids under high pressures, considerable packing was required about the valve stems to provide seals against leakage when the valves were opened. The amount of packing required added to the frictional resistance in turning the valve to open or closed position so that wrenches or other mechanical advantage devices were needed to operate the misnamed hand valves. Other forms of leakage seals for the valve stem provided resilient packing about the valve stems which were bonded to the stems and to the sides of the valve housing. Constant use soon broke the bond making the packing useless for the intended purpose. The packing thus provided also added to the frictional resistance in operating the valves in that the packing increased the diameter of the valve stem offering a greater area against which the fluids under pressure could act.

An object of our present invention is to provide an improved valve for controlling fluids under high pressure in which a resilient sleeve is provided for the valve stem for effectively sealing the same against leakage.

Another object of this invention is to provide a high pressure valve in which the effects of high pressure acting upon the valve stem are minimized.

A further object of this invention is to provide a highly improved rugged and compact valve for controlling fluids under high pressures which shall be easy to operate, relatively inexpensive to manufacture, positive in its action, which shall have a large variety of applications, and yet be practical and efficient to a high degree in use.

Other objects of the invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

In the single figure of the drawings, in which one of the various possible illustrative embodiments of this invention is shown in cross-section and partially in elevation, 10 designates a valve body having an axially disposed threaded bore 11, a centrally disposed chamber 12, hereinafter called the outlet chamber; a second chamber 13, of smaller diameter, hereinafter called the valve chamber, and an opening 14, the lower portion of opening 14 being threaded as at 15. The bore 11, chambers 12, and 13, and opening 14 are coaxially disposed in body 10 and form a continuous opening through said body. The valve body 10 is further formed with an extension 16 provided with a threaded bore 17, the lower end of which tapers to a small opening 18 registering with the chamber 12.

Seated on a shoulder 19 formed in outlet chamber 12 by its restricted opening into the valve chamber 13 is a resilient washer 20. Seated on said washer is a hollow cylindrical member 21 provided with a peripheral groove 22 about its median exterior and forming an arcuate chamber 23 registering with the opening 18. A plurality of ports 24 connect the interior 25 of said member with the arcuate chamber 23. A restricted passage 26 is formed in the lower portion of the member 21 by the tapered wall 27 extending into chamber 13 and forming a valve seat 28 within the chamber 13.

The member 21 is held in place on washer 20 and shoulder 19 by means of an externally and internally threaded bushing 29 threaded into bore 11. The lower end of bushing 29 abuts against a metal washer 30 having a tapered lower face, which in turn abuts a resilient washer 31 having both faces tapered. The resilient washer 31 is seated on a metallic disc 32 having an upper tapered face and provided with an opening 33. The lower face of disc 32 abuts against the upper edge of member 21. An inward or downward threading of bushing 29 will squeeze the elements together and compress the resilient washers 20 and 31 to form a gas tight seal.

Screwed into bushing 29 is a threaded handle stem 34 having affixed to the upper end thereof, as by screw 35, a handle 36. Rotation of the handle is limited by a stop arm 37 fixed to the body 10 by screw 38, and coacting with an arcuate groove 39 cut into the underside of handle 36.

Slidably received within the opening 33 of disc 32 is a valve stem 40, the upper end of which abuts the bottom of handle stem 34. At the lower end of the stem 40 and within the valve chamber 13 is a valve member 41 provided with a resilient pad 42 adapted to abut the valve seat 28. A coil compression spring 43 seated on an inlet nipple 44 threaded into bore 14 biases the valve against the valve seat.

Turning valve handle 36 so that the handle stem 34 will be screwed downwardly, will cause the valve stem 40 to unseat the valve 41 against the bias of spring 43. It is to be noted that at no time does the valve stem 40 rotate. Fluids or gases under pressure will thus enter the valve body through the nipple 44 into bore 14, around the valve into outlet chamber 25, outwardly through the ports 24 and into the arcuate chamber 23, through opening 18 and out through the outlet bore 17.

Turning the valve handle 36 to unscrew handle stem 34 will permit spring 43 and the gas or fluid pressure acting on the lower face of the valve to close the valve.

Means is now provided to form a gas tight seal about the valve stem 40 to prevent leakage around said stem through the opening 33.

To this end the disc 32 is provided with a depending nipple, or bushing 45 the lower end of which is of greater diameter than the upper end. Slipped over the nipple 45 and valve stem 40 is a resilient sleeve 47, said sleeve being held on nipple 45 by the large diameter of end 46.

When the valve is opened, the resilient sleeve 47 will stretch with the linear movement of valve stem 40. The high pressure gas or fluid entering chamber 23 will squeeze the resilient sleeve tightly about the valve stem and nipple to form a gas tight seal. Due to the comparatively small diameter of valve stem 40 and the resilient sleeve, the pressure acting upon the valve stem will not appreciably affect the turning moment required in opening or closing the valve.

It will thus be seen that there is provided a high pressure valve in which the several objects of this invention are achieved and which is well adapted to meet the conditions of practical use.

As various possible embodiments may be made of the above invention, and as various changes may be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:

1. A valve for controlling the flow of fluid under pressure comprising a housing having a through bore, a hollow plug in one end of said bore, manually operable screw means through said plug closing one end of said bore, an inlet in the other end of said bore, an outlet in said housing, a valve chamber in said housing intermediate said hollow plug and inlet and communicating with said outlet, a hollow valve member in said chamber including a valve seat communicating with said inlet, and port means communicating with said chamber, a valve stem extending through said hollow valve member and engageable with said screw means, a bushing about said stem, resilient sealing means about said stem and bushing, a floating valve member in said bore and engageable with said valve seat and stem, spring means urging said floating valve member into engagement with said valve seat and stem, said manual means being operative to unseat said floating valve member against the bias of said spring means, and said resilient means being pressed into closer sealing engagement with said bushing and stem by the flow of fluid under pressure through said valve.

2. A valve for controlling the flow of fluid under pressure comprising a housing having a through bore, a chamber in said housing, a hollow valve member in said chamber having a valve seat therein colinear with said bore, a plug closing one end of said bore, the opposite end of said bore comprising an inlet, a valve stem extending through said hollow valve member and valve seat, a resilient disc abutting both ends of said hollow valve member, said plug adapted to engage said hollow valve member and compress said discs to seal said chamber, manually operable screw means through said plug in contact with said stem, a bushing about said stem, a resilient sealing sleeve about said bushing and stem, a valve member, spring means urging said valve member against said seat and valve stem, an outlet in said housing communicating with said hollow valve member, said outlet connected to said inlet upon said manually operable screw means axially moving said stem to overcome said spring means and unseat said valve against the bias of said spring means, and said resilient sleeve being pressed into closer sealing engagement with said bushing and stem by the flow of fluid under pressure through said hollow valve member.

BRADFORD B. HOLMES.
JACOB L. PAULY.

REFERENCES CITED

The following references are of record in the file of this patent:

UNITED STATES PATENTS

| Number | Name | Date |
|---|---|---|
| 977,723 | Field | Dec. 6, 1910 |
| 1,495,761 | Moussette | May 27, 1924 |
| 2,076,757 | Westberg | Apr. 13, 1937 |
| 2,118,300 | Ford | May 24, 1938 |